United States Patent [19]

Kane et al.

[11] Patent Number: 5,050,348
[45] Date of Patent: Sep. 24, 1991

[54] PANEL AND BRACKET ASSEMBLY AND METHOD FOR MAKING SAME

[75] Inventors: Edmund J. Kane, Holland; Robert S. Herrmann, Grand Haven, both of Mich.

[73] Assignee: Donnelly Corporation, Holland, Mich.

[21] Appl. No.: 554,013

[22] Filed: Jul. 16, 1990

[51] Int. Cl.⁵ .......................................... E05F 11/44
[52] U.S. Cl. .......................................... 49/351; 49/375
[58] Field of Search ................ 49/375, 376, 374, 350, 49/351, 348, 502, 501

[56] References Cited

U.S. PATENT DOCUMENTS

| | | |
|---|---|---|
| 666,295 | 1/1901 | Wheeler . |
| 2,137,472 | 11/1938 | Forbes . |
| 2,565,232 | 8/1951 | Hezler, Jr. ..................... 49/375 X |
| 2,718,664 | 9/1955 | Schweitzer . |
| 2,736,067 | 2/1956 | Boschi . |
| 3,252,256 | 5/1966 | Sprecher ........................ 49/351 |
| 3,263,014 | 7/1966 | Deisenroth . |
| 3,381,340 | 5/1968 | Chapin, Jr. . |
| 3,754,353 | 8/1973 | Breitschwerdt et al. .......... 49/375 X |
| 3,759,004 | 9/1973 | Kent . |
| 3,783,568 | 1/1974 | Adler et al. . |
| 3,843,982 | 10/1974 | Lane et al. . |
| 3,872,198 | 3/1975 | Britton . |
| 4,072,340 | 2/1978 | Morgan . |
| 4,089,134 | 5/1978 | Koike . |
| 4,240,227 | 12/1980 | Hasler et al. . |
| 4,249,517 | 2/1981 | Schroeder et al. . |
| 4,332,413 | 6/1982 | Erion . |
| 4,336,009 | 6/1982 | Wolf . |
| 4,364,595 | 12/1982 | Morgan et al. . |
| 4,454,688 | 6/1984 | Rest et al. . |
| 4,457,109 | 7/1984 | Royse . |
| 4,457,111 | 7/1984 | Koike . |
| 4,487,448 | 12/1984 | Griffin . |
| 4,494,337 | 1/1985 | Watanabe et al. . |
| 4,561,211 | 12/1985 | Raley et al. . |
| 4,584,155 | 4/1986 | Zanella . |
| 4,585,829 | 4/1986 | Kuo et al. . |
| 4,618,322 | 10/1986 | Lagasse . |
| 4,626,185 | 12/1986 | Monnet . |
| 4,662,113 | 5/1987 | Weaver . |
| 4,712,287 | 12/1987 | Johnston . |
| 4,762,481 | 8/1988 | Weaver . |
| 4,811,519 | 3/1989 | Gold ................................. 49/375 |
| 4,834,931 | 5/1989 | Weaver . |
| 4,944,984 | 7/1990 | Kunert .............................. 428/83 |

FOREIGN PATENT DOCUMENTS 913379 12/1962 United Kingdom .
1080271 8/1967 United Kingdom .

Primary Examiner—Philip C. Kannan
Attorney, Agent, or Firm—Price, Heneveld, Cooper, DeWitt & Litton

[57] ABSTRACT

A panel assembly especially adapted for use as a window in vehicles or other structures where the window is raised and lowered, usually by sliding movement via a scissors linkage or other regulator mechanism. The assembly includes a sheet of material, a gasket or casing portion attached along one peripheral edge portion of the sheet, and a bracket slidably mounted on the gasket after the gasket is attached to the sheet. The gasket, which is typically molded from polymeric material, includes one of several types of retainers for holding the bracket on the gasket without requiring fasteners to extend into or through the sheet. A method for slidably mounting the bracket on the gasket after attachment of the gasket to the sheet is also disclosed. The sheet may be transparent or nontransparent glass, polymeric plastic or other materials.

38 Claims, 5 Drawing Sheets

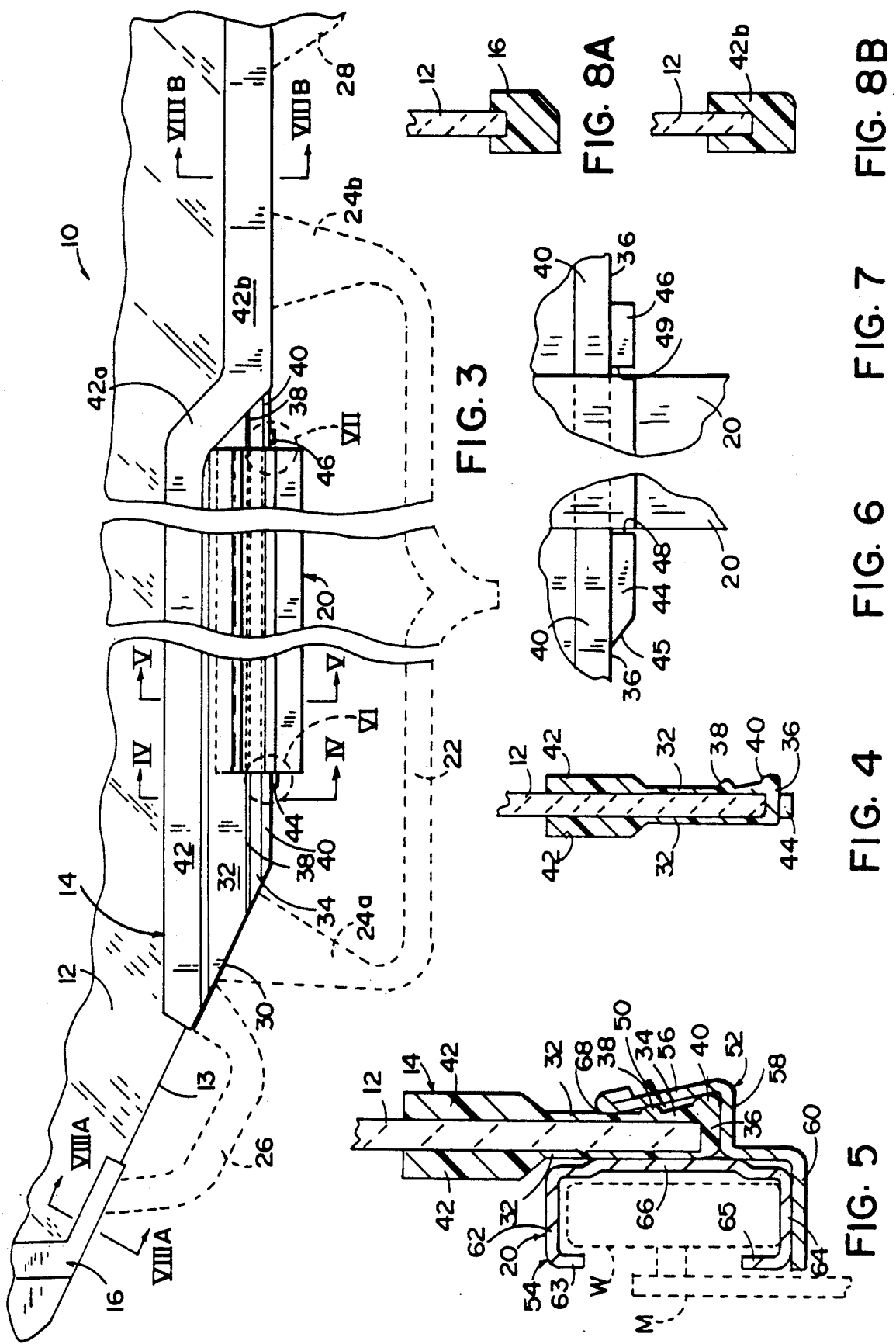

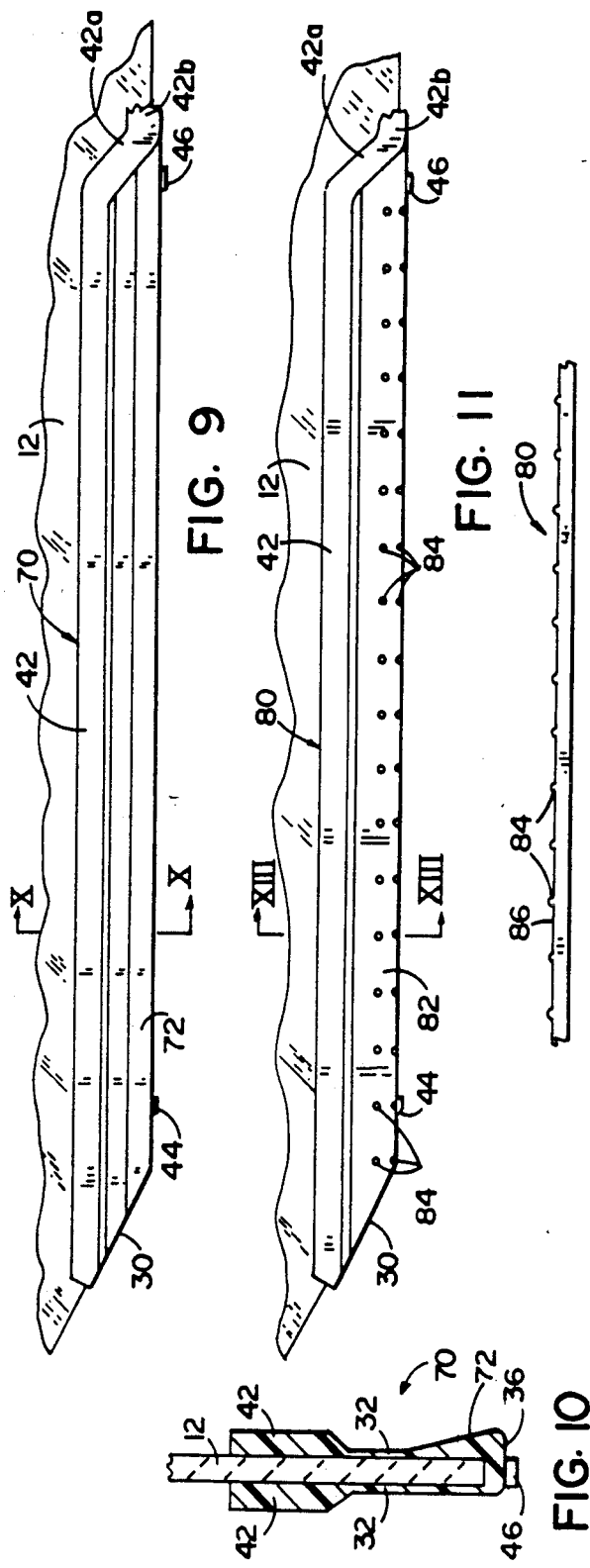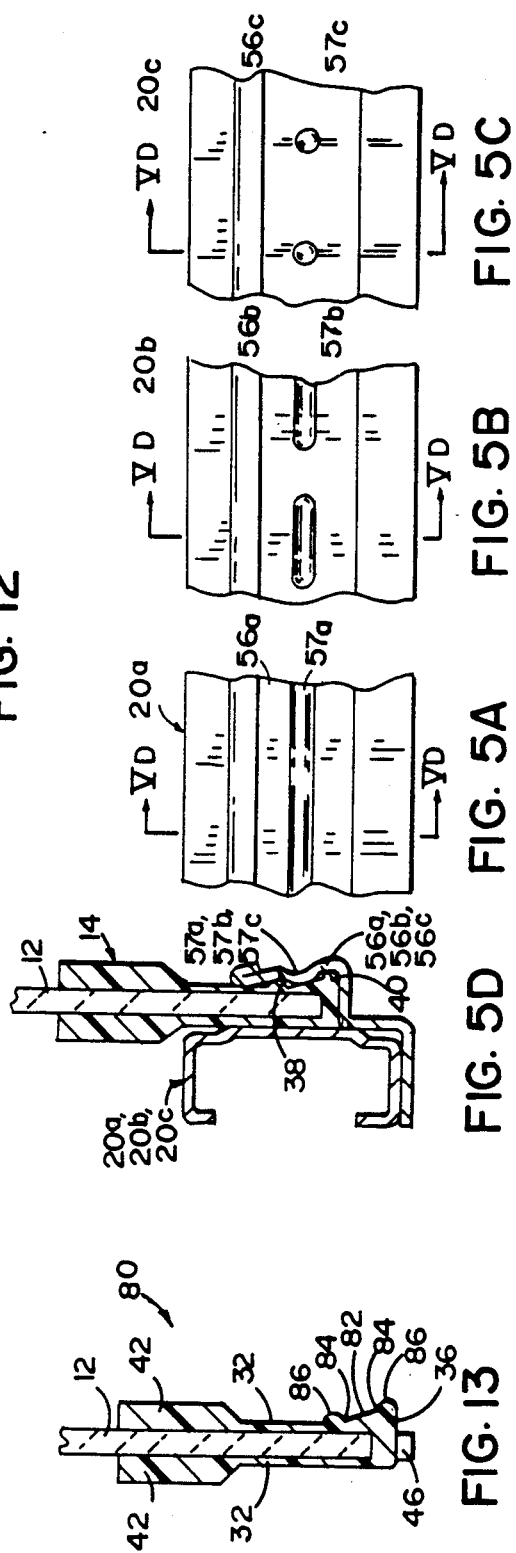

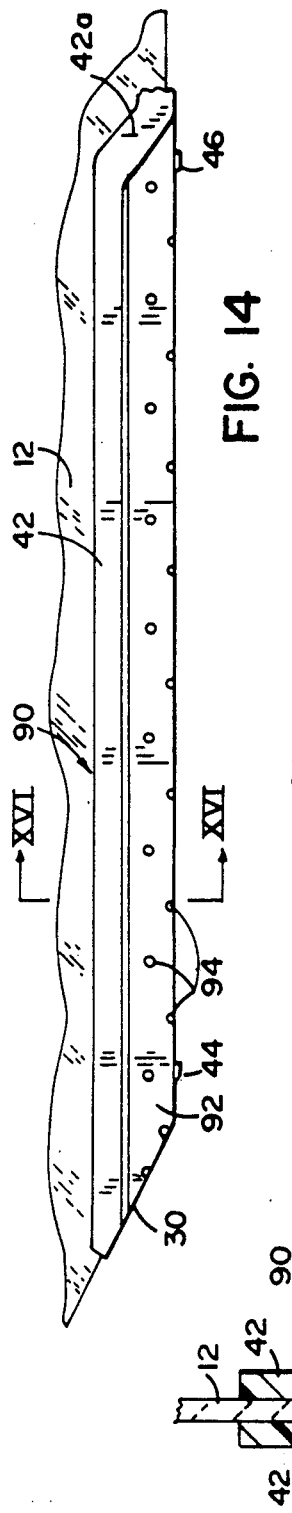

PANEL AND BRACKET ASSEMBLY AND METHOD FOR MAKING SAME

BACKGROUND OF THE INVENTION

This invention relates to panel assemblies having brackets or other structures secured thereto and, more particularly, to a window panel assembly especially adapted for use in vehicles or other structures where the window must be raised and lowered, usually by sliding movement by means of a window regulator connected to the bracket.

In the typical vehicle, two or more side window panels are provided adjacent the driver and passenger which may be raised and lowered typically by sliding movement via hand-operated or electrical mechanisms. The window panel assemblies are mounted in tracks or channels and are generally moved vertically. It is common to provide a bracket along the bottom edge of the window which allows for the attachment of a scissors linkage, gear driven regulator mechanism, tape or cable drive system to move the window when desired. The brackets typically provide a channel for receipt of rollers or other connections to the mechanisms and are preferably rigidly secured to the window panel in one of various known methods.

One of the prior known window bracket attachment methods is to fit a channel-type bracket over a casing on a peripheral edge of a window panel. The assembly has previously been drilled to provide apertures entirely through the window glass and casing. Appropriate screws or other fasteners are inserted through the bracket, casing and the window glass to hold the bracket in position. Not only does such method require drilling or boring of the window glass which often results in glass breakage and increased waste due to rejection of the assembly, but the fasteners can loosen after repeated usage causing rattles and sloppy operation for the window over the lifetime of the vehicle.

Alternate methods for attaching regulator mechanisms to vehicle windows have included the provision of precast or premolded gasket portions or sash plates having integral attachment areas or channels therein which are secured to a window edge after their molding. One such sash plate is shown in U.S. Pat. No. 4,561,211 to Raley et al. which includes an integral channel for receiving the roller of a regulator mechanism but does not require a separate bracket other than the sash plate secured to the window itself. The separate sash plate must be secured either by appropriate adhesives or mechanical fasteners and can loosen and result in the same problems described above for the brackets applied with fasteners through bored or drilled holes in the glass.

Yet another method is shown and described in U.S. Pat. No. 4,662,113 to Weaver wherein a metal channel-type bracket and a glass window sheet are simultaneously inserted within a mold cavity followed by injection of polymeric molding material between the bracket and glass and around various edges of the window such that the material, when cured, adheres the bracket to the glass. This assembly requires a complex mold in which the bracket is precisely positioned around portions of the sheet glass edge followed by injection molding fully throughout the mold cavity between the bracket and glass, typically using reaction injection molded polyurethane materials, followed by appropriate curing If the bond between the glass and molding material or between the bracket and molding material is less than secure, failure of the resulting assembly during operation may result.

Therefore, a need was apparent for a window panel assembly including a bracket reliably and easily secured to a window to allow attachment of a window regulator mechanism both for vehicles and other structures, as well as a method for making such a panel assembly which would allow simple attachment of the bracket over an edge of a window without requiring fasteners to extend into or through the window and which would provide secure, stable operation over the life of the window.

SUMMARY OF THE INVENTION

Accordingly, the present invention provides a panel assembly including a separately mounted bracket especially adapted for use in vehicles or other structures where the panel is a window which must be raised and lowered, typically by sliding movement via one of several types of regulator mechanisms such as a scissors linkage or the like which is connected to the bracket.

In one form, the invention is a panel assembly comprising a sheet of material, which may be transparent if the assembly is a window, a peripheral gasket formed from a plastic or polymeric material and extending along one edge of the sheet, and a bracket mounted on the gasket. The bracket includes receiving means for receiving a portion of the gasket and the one edge portion of the sheet. In addition, the gasket and bracket include means for slidably mounting the receiving means thereover after the gasket is attached to the sheet. Further, the gasket includes retaining means engaging the receiving means for holding the bracket on the sheet without requiring fasteners to extend into or through the sheet.

In preferred forms of the invention, the retaining means on the gasket may include an elongated, wedge-shaped gasket portion received within a channel-shaped chamber on the bracket defined by a pair of sidewalls and a bottom wall opposite to an elongated opening which is narrower than the wedge-shaped gasket portion to hold the bracket on the assembly.

In other forms, the retaining means may include at least one rib extending along the wedge-shaped gasket portion for engaging the receiving means or a plurality of spaced projections which extend outwardly from the wedge-shaped gasket portion. The ribs and/or projections may be either aligned or staggered. The bracket may include one or more recesses or depressions adjacent the ribs and/or projections to help retain the bracket on the gasket.

In order to locate and help retain the bracket on the gasket, a flexible/compressible detent may be included on the gasket to flex or compress when the bracket is slid thereover and return to its original position after passage of the bracket to resist removal of the bracket. A second detent may be included to position the bracket and also resist sliding removal of the bracket. At least one of the detents may include an inclined lead-in surface to facilitate mounting of the bracket.

In yet other aspects, when the panel assembly is adapted for use as a window, the bracket may include means for raising and lowering the window assembly when the window is slidably mounted within a vehicle or other structure.

Further, the gasket may include a thickened portion adhered to the glass outside of the bracket to facilitate retention of the gasket on the sheet.

In yet other aspects of the invention, a method is disclosed for making a panel assembly especially for slidable mounting in a vehicle or other structure comprising the steps of providing a sheet of material, attaching a gasket to one edge portion of the sheet, and sliding a bracket over the gasket until retaining means on the gasket engage and hold the bracket in position on a portion of the gasket. In this method, the bracket may be slid onto the gasket either through an end opening or by means of the elongated opening through which the glass sheet and gasket extend after assembly Preferably, the gasket is formed on the sheet by molding with a plastic or polymeric molding material such as reaction injection molded polyurethane, the gasket being adhered and bonded to the sheet by forming and curing within a mold apparatus.

As will be understood from the invention, numerous advantages over the prior known panel assemblies and assembly methods are provided by this invention. These include secure, reliable attachment of a gasket to a sheet followed by efficient assembly of a bracket without the need to provide fasteners extending into or through the sheet. This is especially useful where the panel is a glass window since drilling through the window, and consequent breakage and waste, are avoided. As a result, the rejection rate for assemblies including brackets mounted in accordance with the present invention is considerably reduced due to the elimination of any need to pierce the sheeting. In addition, the bracket is quickly and efficiently mounted on the gasket and provides a simple yet reliable mechanical structure to hold the bracket in place after assembly. Overall, the assembly may be provided in various forms as windows to fit various vehicles or other structures and can accommodate varying types of window regulator mechanisms including scissors-type linkages or the like.

These and other objects, advantages, purposes and features of the invention will become more apparent from a study of the following description taken in conjunction with the drawings.

BRIEF DESCRIPTION OF THE DRAWINGS

FIG. 3 is an enlarged, fragmentary, broken plan view of the bottom portion of the window panel assembly shown in FIGS. 1 and 2;

FIG. 4 is a sectional view of the window panel assembly taken along plane IV—IV of FIG. 3;

FIG. 5 is a sectional view of the window panel assembly taken along plane V—V of FIG. 3 and also illustrating a roller from a scissors-type window regulator mechanism;

FIG. 5A is a fragmentary side view of an alternate bracket for use in the assembly;

FIG. 5B is a fragmentary side view of another alternate bracket for use in the assembly;

FIG. 5C is a fragmentary side view of yet another alternate bracket for use in the assembly;

FIG. 5D is a fragmentary, sectional view of the alternate brackets taken along lines VD—VD of each of FIGS. 5A, 5B and 5C;

FIG. 6 is a fragmentary, enlarged, side view of one of the retaining projections on the assembly and illustrating area VI of FIG. 3;

FIG. 7 is a fragmentary, enlarged, side view of another of the retaining projections on the assembly and illustrating area VII of FIG. 3;

FIG. 8A is a fragmentary sectional view of another portion of the window panel assembly taken along plane VIIIA—VIIIA of FIG. 3;

FIG. 8B is a sectional view of another portion of the window panel assembly taken along plane VIIIB—VIIIB of FIG. 3;

FIG. 9 is a fragmentary side view of a second embodiment of the window panel assembly of the present invention showing another form of the gasket thereon;

FIG. 10 is a fragmentary sectional view taken along plane X—X of FIG. 9;

FIG. 11 is a fragmentary side elevation of a third embodiment of the window panel assembly of the present invention illustrating another form of the gasket thereon;

FIG. 12 is a fragmentary bottom view of the gasket and window panel assembly of FIG. 11;

FIG. 13 is a fragmentary sectional view of the window panel assembly taken along plane XIII—XIII of FIG. 11;

FIG. 14 is a fragmentary side elevation of a fourth embodiment of the window panel assembly of the present invention illustrating another form of the gasket thereon;

FIG. 15 is a fragmentary bottom view of the assembly of FIG. 14;

FIG. 16 is a fragmentary sectional view of the assembly taken along plane XVI—XVI of FIG. 14;

FIG. 17 is a fragmentary side elevation of a fifth embodiment of the window panel assembly illustrating yet another form of the gasket thereon;

FIG. 18 is a fragmentary bottom view of the window panel assembly of FIG. 17;

FIG. 19 is a fragmentary sectional view of the assembly taken along plane XIX—XIX of FIG. 17;

DESCRIPTION OF THE PREFERRED EMBODIMENTS

Figure 1:
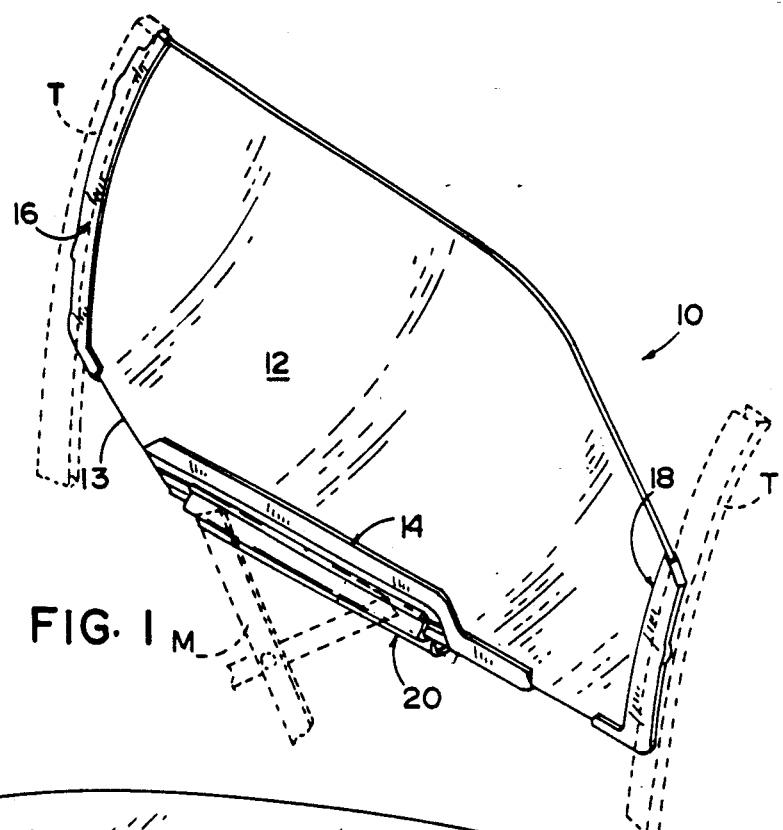
FIG. 1 is a perspective view of a window panel assembly of the present invention incorporating a bracket adapted to receive a scissors-type regulator mechanism for raising and lowering the window and illustrating the tracks for guiding the sliding movement of the window panel assembly.
Figure 2:
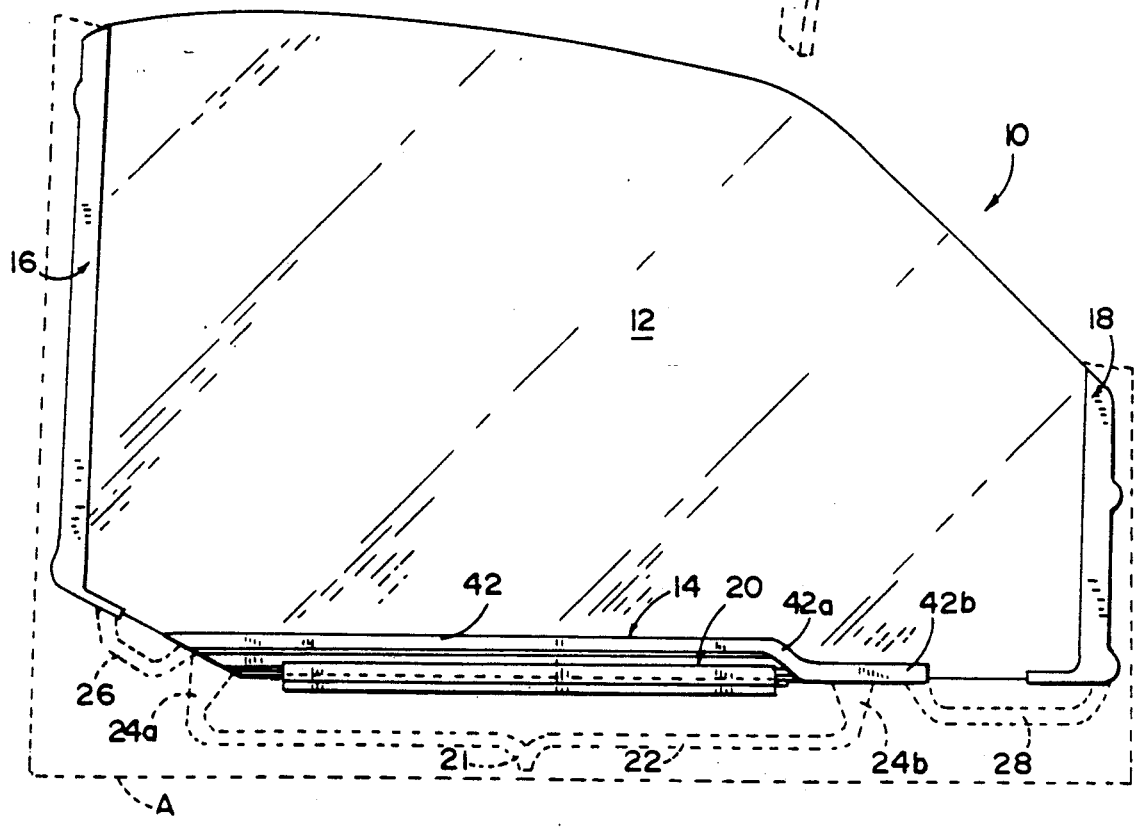
FIG. 2 is a plan view of the window panel assembly shown in FIG. 1 and also illustrating a portion of a suitable mold apparatus used to form the gasket portions on the transparent sheet material prior to mounting of the bracket.

Referring now to the drawings in greater detail, FIGS. 1 and 2 illustrate a first form 10 of the panel assembly of the present invention. Assembly 10 is especially adapted for use as a vehicle window and includes a configured, curved sheet of transparent glass which may be tempered, laminated or otherwise strengthened in accordance with conventional principals and also includes three spaced peripheral edge gasket or casing portions 14, 16, 18. Preferably, gasket portions 14, 16 and 18 are formed in a molding apparatus into which sheet 12 is inserted from a plastic or polymeric molding material, preferably reaction injected molded polyurethane or polyvinyl chloride polymeric materials of sufficient strength, rigidity and hardness. Gasket portion 14 is adapted to slidingly receive thereover a channel-type bracket 20 which is retained in position by portions of the gasket after assembly as explained hereinafter. However, simultaneously with the formation of gasket 14, separate, spaced gasket portions 16, 18 may also be formed on other peripheral edge portions such as the vertical rear edge of the window and the vertical forward edge of the window. Rear and front edge gasket portions 16, 18 are adapted to be received in tracks or channels T shown in phantom in FIG. 1 which are usually fitted in the doors of a vehicle to guide the substantially vertical movement of the window assembly. In addition, bracket 20 is adapted to receive rollers from a scissors-type regulator or raising and lowering mechanism M as also shown in phantom in FIGS. 1 and 5.

With reference to FIGS. 2 and 3, the lower half of a suitable mold apparatus A is shown in phantom including representative runners or channels through which mold material such as polymeric reaction injected molded polyurethane components which have been previously mixed together with an aftermixer device, or polyvinyl chloride materials, are injected into suitable mold cavities to form the gasket or casing portions 14, 16, 18 on the transparent sheet 12 which is simultaneously held within the mold half. The channels or runners include a main runner 22 which is a bifurcated channel leading from a common aftermixer and channel 21 and having fan-shaped exit portions 24a, 24b adapted to introduce molding material into the cavity which forms gasket portion 14 from either end of the cavity. Alternately, only one exit portion such as portion 24a need be used to fill the cavity from that single exit. Also, additional exits could be included at other areas of the cavity. Bracket 20 is not included in the mold half or mold assembly at the time gasket portion 14 is formed. The cavity forming gasket portion 14 forms a connection chamber leading to secondary mold channels or runners 26, 28 which lead to gasket portions 16, 18 respectively. Runners or channels 26, 28 are spaced away from the edge of sheet material 12 to avoid applying extraneous molding material to the sheet while efficiently directing molding material to the cavities forming gasket portions 16, 18 which wrap around the lower corners of the transparent sheet. Thus, the overall weight of the assembly is maintained at a minimum by reducing the necessary amount of gasket material on the edges of the sheet.

Prior to injecting the polymeric material through runners 21, 22, 24a, 24b, 26, 28, a sheet 12 of transparent material, preferably glass, is placed within a recess in the lower mold half A such that the edges of the sheet project into mold cavities adapted to form the gasket portions 14, 16, 18. Sheet 12 is preferably coated on the edges which will receive cavities 14, 16, 18 with a suitable, conventionally known primer which enhances the adherence or bond between the polymeric material and the glass surfaces during molding. Thereafter, the desired polymeric material is injected through the runners or channels 21, 22, 24, 26, 28 such that the mold cavities are filled to form gasket portions 14, 16, 18. As Will be understood from FIGS. 8A and 8B, the lower portion of gasket 16 has a section which envelopes and encapsulates the upper end of glass edge 13 while a similar but slightly thicker section is provided in the connecting portion 42b of gasket 14. After the polymeric material cures and/or sets up, the partially formed window assembly including gasket portions 14, 16, 18 adhered and bonded to the appropriate edges is removed from the mold once the top half of the mold apparatus is withdrawn. As is conventionally known in the molding art, appropriate seals may be included in the upper and lower mold halves to close off mold cavities 14, 16, 18 to prevent the escape of molding material during the molding process.

Although the use of plastic or polymeric molding material such as reaction injection molded polyurethane is preferred, polyvinyl chloride could alternately be used for the gaskets if made sufficiently rigid to prevent pulling of the bracket therefrom and such that gasket portions 16, 18 which slide in guide tracks T are also sufficiently rigid. A suitable primer to be applied to the glass sheet 12 before molding of the gasket portions from reaction injection molded polyurethane may be obtained from Lord Corporation of Erie, Pa. under the product designation Chemlock AP-134. In addition, it is possible that other polymeric materials may be used to form the gasket portions and that other transparent sheeting such as acrylic or other plastic materials may be used instead of glass depending on the desired window application. Of course, glass coated with an opaque or translucent frit layer or other opaque or translucent sheet mat®rials may be substituted for the transparent glass or plastic sheeting of assembly 10 to produce other panel assemblies within the scope of this invention.

Referring now to FIGS. 3-8, elongated gasket 14 is adapted to receive bracket 20 (or 20a, 20b or 20c of FIGS. 5A-5D) slidably thereover in window panel assembly 10 as shown. Gasket 14 is an elongated member extending along a portion of the bottom edge of sheet 12 from the slanted edge 13 to a position near but spaced from the forward edge of the window over which gasket 18 is applied. As shown in FIGS. 1-3, gasket 14 is spaced and separated from gaskets 16 and 18 along the window edge. Gasket 14 includes a slanted edge 30 paralleling glass edge 13 over which the bracket 20 is adapted to be slid for assembly. The gasket envelopes and encapsulates the edge of glass sheet 12 on the area in which it is formed and includes thin layers 32 spaced upwardly from the lower edge of the sheet glass, a wedge-shaped retaining portion 34 adjacent the lower edge of the glass sheet on the outer side of the glass, and a bottom portion 36 joining the longer thin section 32 on the inside surface of the glass and wedge-shaped portion 34. Wedge-shaped portion 34 on the outer glass surface is adapted to mate and engage with the inside surface of a tapered chamber 50 forming a channel portion in bracket 20 or 20a, 20b or 20c as is explained hereinafter. Although wedge-shaped portion 34 may be smooth-sided as shown below in connection with FIGS. 9 and 10, gasket 14 includes a pair of spaced, longitudinally extending ribs 38, 40, each of which has a cylindrical outer surface adapted to engage the inside surface of the bracket. Rib 38 is slightly thinner than rib 40 although the two ribs together are adapted to provide sufficient contact surface to retain bracket 20 thereover while providing somewhat lesser resistance to sliding assembly of the bracket on the gasket than the smooth-sided embodiment. Thin portions 32 provide a necked-down gasket area adapted to extend through opening 68 to the bracket as is explained more fully hereinafter.

Spaced outside the bracket and above thin portions 32 are thickened gasket portions 42. Portions 42 extend along both sides of the glass sheet above the area in which bracket 20 is slidably mounted and angle downwardly toward the lower edge of the glass at area 42a to provide a connection section 42b at one end of the bracket. As shown in FIG. 2, connection section 42b extends sufficiently far toward the forward edge of sheet 12 to provide a connection between the fan-shaped opening 24b of runner/channel 22 in the mold apparatus and runner 28 which extends to the cavity forming gasket 18. Thickened portions 42 are provided for better adhesion of gasket 14 to the sheet glass surfaces by providing a better curing heat for the primer thereby producing better overall adhesion strength for the gasket to the glass after molding.

As is best seen in FIGS. 3, 4, 6 and 7, the outer surface of gasket bottom 36 includes a pair of spaced flexible, compressible, resilient locating and retaining projections 44, 46 each of which has a flat abutment surface 48, 49, respectively, for engaging an end edge surface of bracket 20 as explained hereinafter. Projection 44 has an inclined lead-in surface 45 which allows the bracket end edge to pass easily over and past projection 44. The projection is sufficiently resilient to flex and/or compress to allow such passage. Once the bracket is moved past projection 44, the leading end edge of the bracket engages abutment surface 49 on projection 46 to locate the bracket along gasket 14. At the same time, the trailing end edge of bracket 20 has completely passed over projection 44 such that it is immediately adjacent abutment surface 48 to resist removal of the bracket. Accordingly, projections 44, 46 locate and position the bracket along gasket 14 during and after assembly and resist withdrawal of the bracket from the gasket in either direction along the length of the gasket.

As shown in FIGS. 1-3 and 5, bracket 20 is preferably formed from two bent pieces of thin gauge, sheet steel including an L-shaped piece 52 and a channel-shaped piece 54. L-shaped piece 52 includes an inwardly inclined sidewall 56, bottom wall 58, and an L-shaped flange 60 adapted to support the channel-shaped portion 54. The channel-shaped portion 54 includes parallel top and bottom walls 62, 64, respectively, and sidewall 66. Members 52 and 54 are preferably spot welded together between sidewall 66 and L flange 60 at several places When thus assembled, sidewall 66 and inwardly angled sidewall 56, together with bottom wall 58, form a wedge-shaped hollow chamber or channel 50 having openings at either end and an elongated opening 68 which is narrower than the width of bottom wall 58 and provides an opening through which the sheet glass 12 and its encapsulating gasket 14 extend out of the bracket. Likewise, channel portion 54 is sized to receive rollers/wheels W from a window regulator mechanism such as scissors-type linkage M as shown in FIG. 5. The inturned flanges 63, 65 on the top and bottom 62, 64 of the channel portion as well as upturned flanges at the ends of the bracket (not shown) prevent the rollers from escaping after insertion.

When slidably mounted over gasket 14 and the periphery of the sheet glass, ribs 38, 40 engage the inside surface of wall 56 and, due to the wedge shape of the retaining area on the gasket, prevent the bracket from being pulled downwardly off the window panel assembly. Locating projections 44, 46 prevent longitudinal sliding movement of the bracket by engaging the end edge surfaces of the bracket after assembly as described above. Once assembled, however, the bracket is securely retained in position and prevented from rattling by engagement of the bracket with the polymeric gasket portions and is prevented from being pulled downwardly off the assembly by the wedge-shaped portion of the gasket.

To facilitate retention of the brackets on gasket 14, alternative bracket forms 20a, 20b and 20c are shown in FIGS. 5A, 5B, 5C and 5D. Each of the modified brackets is substantially similar to bracket 20 except that the inwardly angled sidewall 56 of L-shaped piece 52 has been changed to include one of several types of recesses or depressions which engage gasket 14 between ribs 38, 40 to positively hold and lock the bracket on the gasket. Thus, as shown in FIGS. 5A and 5D, bracket 20a includes an elongated recess or depression 57a in sidewall 56a extending the full length of sidewall 56a. Alternately, as shown in FIGS. 5B and 5D, sidewall 56b may include spaced or segmented recesses or depressions, each of which is slightly elongated but spaced from one another along the length of the bracket sidewall. As shown in FIGS. 5C and 5D, instead of the elongated depressions or recesses, spherical depressions 57c may be provided in sidewall 56c. Each of the recesses or depressions 57a, 57b and 57c has a rounded undersurface as shown in FIG. 5D helping to allow the channel to be slid over gasket 14 but allowing the recesses or depressions to fit between ribs 38, 40 and engage the surface of wedge-shaped portion 34. Thus, should a downward pressure be exerted on the bracket with respect to sheet 12 and gasket 14, recesses or depressions 57a, 57b or 57c would resist removal of the bracket from the gasket by engagement of those recesses or depressions with the lowermost rib 40.

As shown in FIGS. 9-19, Where like numerals indicate like parts to those in gasket 14, numerous other configurations for the retaining portion of the gasket over which the bracket 20 is adapted to be slidably fitted may be provided in the window assembly. A second form 70 is shown, for example, in FIGS. 9 and 10. In gasket 70, instead of a pair of spaced ribs along the wedge-shaped retaining gasket portion, a smooth, planar, inclined surface 72 is provided angling from the bottom surface 36 to the surface of the thinner portion 32 on the outer side of the assembly. When bracket 20 is slid thereover, the entire surface 72 engages the inside surface of the bracket wall 56 while projections 44, 46 locate and lock it in position along the length of the gasket.

As shown in FIGS. 11-13, a third embodiment 80 of the gasket is modified to include a series of generally spherical projections 84 having rounded, outwardly curved surfaces 86 thereon extending from inclined surface 82 on the outer side of the gasket. Projections 84 are aligned vertically in pairs, which pairs are spaced from one another along the entire length of the bracket receiving portion of the gasket 80 as is best seen in FIG. 11. Any of brackets 20, 20a or 20b are adapted to be slid over gasket 80 from the inclined end edge 30, the left-hand side of FIG. 11. The bracket slides over the rounded outer surfaces 86 of projections 84 until it is located and positioned by projections 44, 46 as described above. The wedge shape of the retaining portion on gasket 80, together with projections 84, prevent brackets 20, 20a, 20b or 20c from being pulled therefrom. In the case of brackets 20a or 20b, recesses or depressions 57a, 57b engage between the rows of projections 84 to help resist removal. Depressions 57b are preferably spaced in alignment with projections 84.

A fourth embodiment of the assembly including gasket 90 is shown in FIGS. 14–16 including spherical projections 94 which are positioned in an alternating, staggered array along the inclined side surface 92 of wedge-shaped retaining portion on the gasket 90. Each projection 94 has a rounded, outwardly curved surface 96 similar to those on projections 84 in gasket 80, which surfaces are adapted to engage the inside surface of bracket wall 56 for retention of the bracket. As in the other embodiments, locating projections 44, 46 are also included. Gasket 90 may be used with any of brackets 20, 20a or 20b. As with gasket 80, depressions 57a or 57b engage between the rows of projections 94 and resist removal of the bracket. Preferably, depressions 57b are aligned with the lower row of projections 94 for best retention.

A fifth form 100 of the gasket is shown in FIGS. 17–19. Gasket 100 includes a series of segmented longitudinally aligned and vertically staggered rib segments 104, 106 formed along the planar, inclined side surface 102 of the wedge-shaped retaining portion of gasket 100. Each of the rib segments 104, 106 includes a generally planar outer surface best seen in FIGS. 19. These outer surfaces are generally parallel to retaining portion angled surface 102. In addition, each rib segment includes an inclined end surface 104a, 106a at the left end of each segment over which any of brackets 20, 20a, 20b or 20c is adapted to be slid upon assembly. As with the other gaskets, locating, positioning projections 44, 46 are also included. Gasket 100 allows brackets 20, 20a, 20b or 20c to be slid thereover from the angled edge 30 such that the outer surfaces of rib segments 104, 106 engage the inside surface of sidewall 56 with depressions 57a, 57b or 57c engaging between rib segments 104, 106 after assembly to retain the bracket on the window. Preferably, depressions 57b, 57c are aligned with rib segments 106 for best retention.

Figure 20:
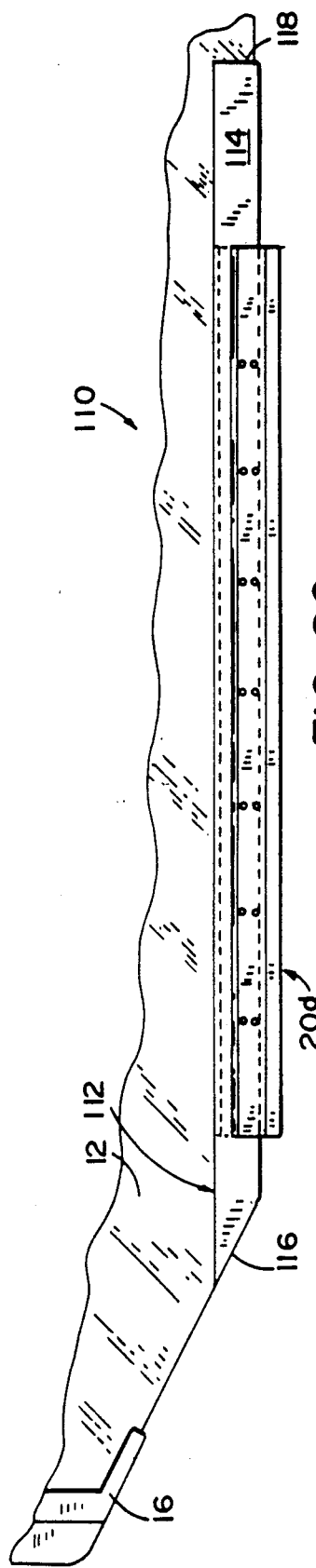
FIG. 20 is a fragmentary side elevation of a sixth form of the window panel assembly of the present invention including a bracket fitted over a gasket thereon from the bottom of the window panel assembly.
Figure 21:
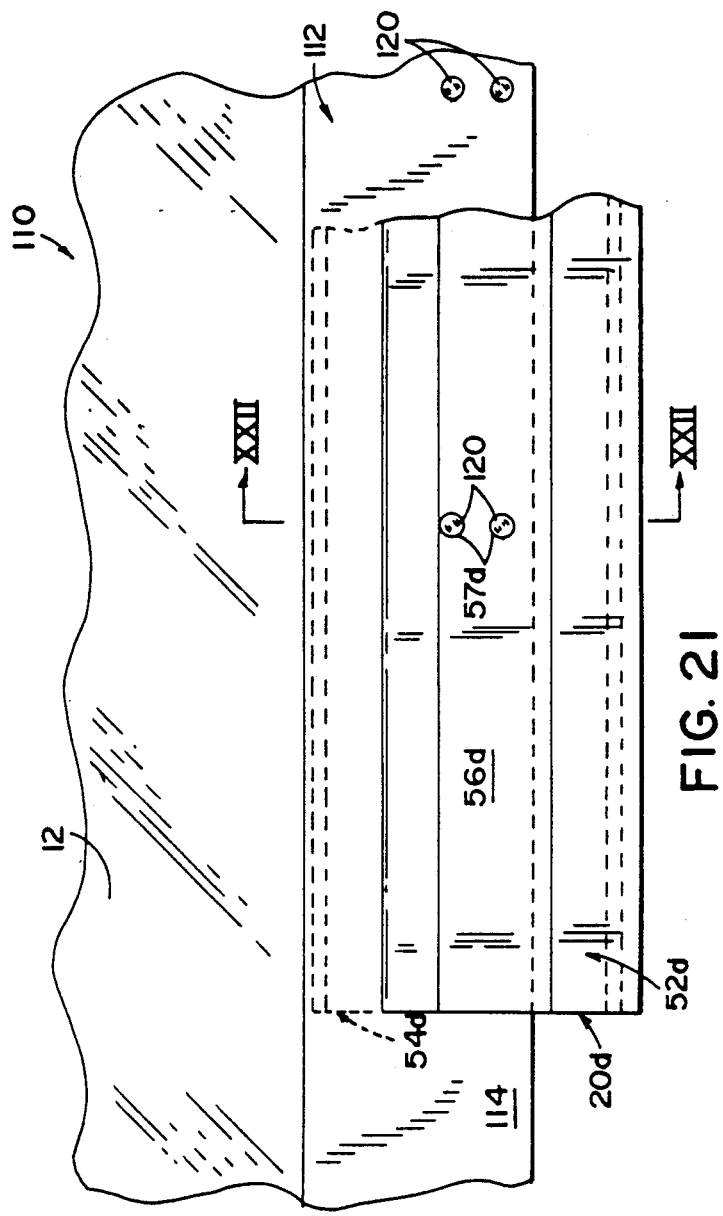
FIG. 21 is a fragmentary, enlarged side elevation with portions broken away of the window panel assembly of FIG. 20.
Figure 22:
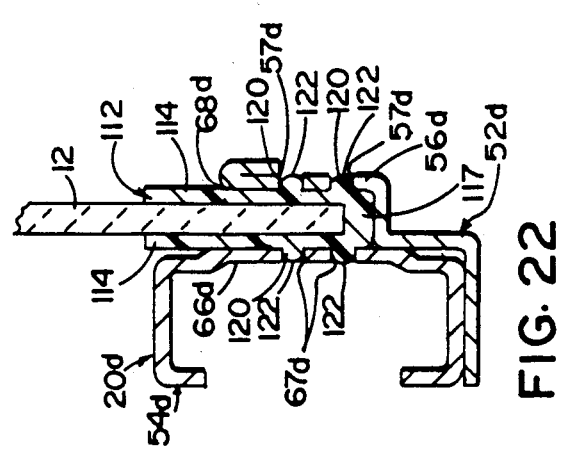
FIG. 22 is a fragmentary sectional view of the window panel assembly taken along plane XXII—XXII of FIG. 21.

A sixth form of the window assembly 110 is shown in FIGS. 20–22 where like parts are indicated by like numerals and includes a modified gasket 112, a modified bracket 20d, and a modified assembly method by which the bracket is slidably mounted over the gasket 112. In embodiment 110, gasket 112 is in simplified form and includes an elongated body portion 114 extending along either side of the lower glass sheet edge from an upwardly angled portion 116 to an end surface 118. Body portions 114 are of substantially uniform thickness on either side of sheet 12 and somewhat thicker than the thin sections 32 described above for gaskets 14, 70, 80, 90 and 100. Instead of a lower wedge-shaped retaining portion, gasket 112 includes a series of outwardly extending, generally cylindrical projections 120 having rounded, outwardly curved surfaces 122. Projections 120 are vertically aligned in pairs, which pairs are spaced from one another along the length of the gasket over which bracket 20d is adapted to be mounted. Projections 120 extend generally perpendicularly to body portions 114 and the side surfaces of glass sheet 12 as shown in FIG. 22.

Modified bracket 20d is adapted to fit over gasket 112 from the bottom and includes modified L-shaped and channel members 52d and 54d. L-shaped member 52d includes a sidewall 56d which extends substantially parallel to sidewall 66d of channel portion 54d. Sidewalls 56d, 66d each include aligned pairs of circular apertures 57d, 67d which are adapted to receive projections 120 when the bracket is slid over gasket 112. When so received, the projections 120 retain bracket 20d on the gasket 112 and resist its removal both longitudinally and vertically off the bottom edge of the assembly.

In order to assemble bracket 20d on gasket 112, the elongated opening 68d between sidewalls 56d, 66d is aligned with the bottom 117 of gasket 112 such that apertures 57d, 67d are in alignment with projections 120 on either side of the gasket. The bracket is then press-fitted upwardly over the thickness of the glass sheet and gasket. The projections 120 are somewhat resilient, flexible and compressible and slide over the inside surfaces of the sidewalls via their rounded outer surfaces until they are seated within apertures 57d, 67d. In addition, bracket 20d has some resiliency which allows sidewall 56d to spring slightly outwardly during such assembly to receive projections 120 through opening 68d after which the sidewall returns to its original position. Thereafter, the strength of the projections resist withdrawal of the bracket from the assembly. In this case, locating, positioning projections 44, 46 are unnecessary because of the retaining and positioning functions of the projections 120 in the bracket apertures.

As mentioned above, each of the gaskets 14, 70, 80, 90, 100 and 112 is preferably formed from a polymeric molded material such as polyvinyl chloride or reaction injection molded polyurethane. Although not believed necessary, adhesives or primers may be used between the brackets 20, 20a, 20b, 20c or 20d and the gasket portions which are typically formed from formed or bent steel sheeting. Also, other types of brackets may be used for receipt of other window regulator mechanisms besides the scissors-type raising and lowering mechanism M shown herein. Further, other configurations of retaining portions on the gaskets and the depressions in the brackets may be devised within the scope of this invention. In addition, nontransparent sheets or panels may be used to allow formation of panel assemblies for uses other than as windows, such as decorative panel assemblies in vehicles, buildings or the like.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A panel assembly comprising:
   a sheet of material;
   a peripheral gasket formed from a polymeric material and extending along one edge portion of said sheet;
   a bracket mounted on said gasket, said bracket including receiving means for receiving a portion of said gasket and said one edge portion of said sheet;
   said gasket and bracket including means for slidably mounting said receiving means thereover after said gasket is attached to said sheet;
   said gasket including retaining means engaging said receiving means for holding said bracket on said sheet without requiring fasteners to extend into or through said sheet.

2. The panel assembly of claim 1 wherein said receiving means includes an interior chamber for receiving said gasket and an elongated opening to said chamber through which said gasket and sheet extend into said chamber, said elongated opening being narrower than at least portions of said chamber whereby said gasket is prevented from passing through said opening to resist removal of said bracket from said sheet.

3. The panel assembly of claim 2 wherein said means for slidably mounting said receiving means include an opening at one end of said receiving means and communicating with said chamber, said chamber being defined by a pair of sidewalls and a bottom wall opposite said elongated opening; at least one of said sidewalls sloping inwardly toward said elongated opening from said bottom wall.

4. The panel assembly of claim 2 wherein said retaining means include an elongated, wedge-shaped gasket portion received within said chamber.

5. The panel assembly of claim 4 wherein said retaining means also include projecting means on said gasket for engaging an edge of said receiving means to resist sliding removal of said bracket.

6. The panel assembly of claim 5 wherein said projecting means include a flexible detent adapted to flex and/or compress when said receiving means is slid thereover and return to its original position after passage of said receiving means, said detent including an inclined lead-in surface to facilitate mounting of said receiving means on said gasket.

7. The panel assembly of claim 6 wherein said projecting means also include a second detent adapted to engage and locate another edge of said receiving means to position said receiving means on and resist sliding removal of said receiving means from said gasket.

8. The panel assembly of claim 4 wherein said retaining means further include at least one rib extending along said wedge-shaped gasket portion and engaging said receiving means.

9. The panel assembly of claim 8 wherein said includes a depression adapted to engage said rib to help retain said bracket on said gasket.

10. The panel assembly of claim 5 wherein said retaining means include a pair of ribs spaced from one another on said wedge-shaped gasket portion an engaging receiving means.

11. The panel assembly of claim 10 wherein said bracket includes a depression adapted to engage said gasket between said ribs to help retain said bracket on said gasket.

12. The panel assembly of claim 10 wherein said ribs extend along said wedge-shaped gasket portion for substantially the entire length of said receiving means.

13. The panel assembly of claim 10 wherein each of said ribs is segmented into a series of longitudinally aligned rib segments.

14. The panel assembly of claim 13 wherein said rib segments in one of said ribs are staggered with respect to the rib segments in the other of said ribs.

15. The panel assembly of claim 14 wherein each of said rib segments includes an inclined lead-in surface to facilitate slidable mounting of said receiving means on said gasket.

16. The panel assembly of claim 4 wherein said retaining means include a plurality of spaced projections extending outwardly from said wedge-shaped gasket portion and engaging said receiving means.

17. The panel assembly of claim 16 wherein said bracket includes a depression adapted to engage said gasket between said spaced projections to help retain said bracket on said gasket.

18. The panel assembly of claim 17 wherein said depression is at least one of an elongated recess, a plurality of elongated recesses, and a plurality of spherical recesses.

19. The panel assembly of claim 16 wherein each of said projections has a rounded, outwardly curved surface to facilitate slidable mounting of said receiving means thereover.

20. The panel assembly of claim 16 wherein said projections are aligned in pairs along said wedge-shaped gasket portion.

21. The panel assembly of claim 16 wherein said projections are staggered along said wedge-shaped gasket portion.

22. The panel assembly of claim 4 wherein said wedge-shaped gasket portion includes at least one substantially planar, sloping side surface engaging the inside surface of said chamber.

23. The panel assembly of claim 1 wherein said retaining means include at least one flexible detent adapted to flex and/or compress when said channel means is slid thereover and return to its original size after passage of said receiving means.

24. The panel assembly of claim 23 wherein said detent is located on an outer peripheral surface of said gasket portion and includes an inclined lead-in surface to facilitate mounting of said receiving means on said gasket.

25. The panel assembly of claim 23 including a second detent adapted to engage and locate another edge of said receiving means to position said receiving means on and resist sliding removal of said receiving means from said gasket, said second detent also being located o said outer peripheral surface of said gasket portion.

26. The panel assembly of claim 1 wherein said retaining means include at least one projection extending outwardly of said gasket; said receiving means including a channel having an opening therethrough receiving said projection when said channel of said receiving means is slidably mounted thereover.

27. The panel assembly of claim 26 wherein said receiving means includes an interior chamber for receiving said gasket and an elongated opening to said chamber through which said gasket and sheet extend into said chamber, said receiving means having a pair of generally parallel sidewalls defining said elongated opening and a bottom wall, said gasket adapted to be slid into said interior chamber through said elongated opening.

28. The panel assembly of claim 1 wherein said means for slidably mounting said receiving means include an opening at one end of said receiving means and communicating with a chamber within said receiving means.

29. The panel assembly of claim 1 wherein said sheet of material is a transparent window panel, said bracket including means for mounting means for raising and lowering said window assembly when said assembly is slidably mounted within a vehicle or other structure.

30. The panel assembly of claim 29 wherein said means for mounting include a channel on said bracket, said channel adapted to receive rollers from a scissors-type linkage mounted in a vehicle body portion.

31. The panel assembly of claim 1 including at least one additional gasket portion on another peripheral edge of said sheet; said additional gasket portion being spaced from said peripheral gasket and adapted to guide the raising and lowering of said assembly.

32. The panel assembly of claim 1 wherein said sheet is glass; said gasket having a thickened portion adhered to said glass outside of said receiving means to facilitate retention of said gasket on said one edge portion of said glass sheet.

33. The panel assembly of claim 1 wherein said gasket includes at least one additional portion extending outside of said receiving means for connection to at least one runner for molding material within a molding apparatus.

34. A panel assembly comprising:
a sheet of material;
a peripheral gasket formed from a polymeric material and extending along one edge portion of said sheet;
a bracket mounted on said gasket, said bracket including channel means for receiving a portion of said gasket and said one edge portion of said sheet;
said gasket including a thickened portion adhered to said sheet outside of said channel means to facilitate retention of said gasket on said one edge portion of said sheet.

35. The panel assembly of claim 34 wherein said channel means includes an interior chamber for receiving said gasket and an elongated opening to said chamber through which said gasket and sheet extend into said chamber, said channel means having a pair of sidewalls defining said elongated opening and a bottom wall, said gasket adapted to be slid into said interior chamber through said elongated opening.

36. The panel assembly of claim 34 including means for slidably mounting said channel means over said gasket including an opening at one end of said channel means and communicating with a chamber within said channel means, said gasket adapted to be slid into said chamber through said end opening.

37. The panel assembly of claim 34 wherein said sheet of material is a transparent window panel, said bracket including means for mounting means for raising and lowering said window panel assembly when said assembly is slidably mounted within a vehicle or other structure.

38. The panel assembly of claim 34 wherein said gasket and bracket include means for slidably mounting said channel means thereover after said gasket is attached to said sheet; said gasket including retaining means engaging said channel means for holding said bracket on said sheet without requiring fasteners to into or through said sheet.

* * * * *

UNITED STATES PATENT AND TRADEMARK OFFICE
CERTIFICATE OF CORRECTION

PATENT NO. : 5,050,348

DATED : September 24, 1991        Page 1 of 2

INVENTOR(S) : Edmund J. Kane et al.

It is certified that error appears in the above-identified patent and that said Letters Patent is hereby corrected as shown below:

Column 1, line 68:

After "curing" insert --.--

Column 6, line 32:

"mat®rials" should be --materials--

Column 7, line 50:

After "places" insert --.--

Column 11, claim 9, line 39:

After "said" insert --bracket--

Column 11, claim 10, line 42:

"5" should be --8--

Column 11, claim 10, line 44:

"an" should be --and--

UNITED STATES PATENT AND TRADEMARK OFFICE
CERTIFICATE OF CORRECTION

PATENT NO. : 5,050,348
DATED : September 24, 1991
INVENTOR(S) : Edmund J. Kane et al.

It is certified that error appears in the above-identified patent and that said Letters Patent is hereby corrected as shown below:

Column 12, claim 25, line 36:

"o" should be --on--

Column 14, claim 38, line 24:

After "to" insert --extend--

Signed and Sealed this

Twentieth Day of April, 1993

*Attest:*

MICHAEL K. KIRK

*Attesting Officer*     *Acting Commissioner of Patents and Trademarks*